United States Patent [19]
Liu et al.

[11] Patent Number: 5,675,772
[45] Date of Patent: Oct. 7, 1997

[54] DEVICE AND METHOD FOR RECONFIGURING A COMPUTER SYSTEM WITH AN INCOMPATIBLE CPU

[75] Inventors: Chih-Yuan Liu; Huan-Pin Tseng, both of Hsinchu, Taiwan

[73] Assignee: Industrial Technology Research Institute, Hsinchu, Taiwan

[21] Appl. No.: 409,280

[22] Filed: Mar. 23, 1995

[51] Int. Cl.$^6$ ................................................ G06F 15/16
[52] U.S. Cl. ........................................ 395/500; 395/527
[58] Field of Search ................................. 395/500, 275, 395/282, 840, 527, 800, 775

[56] References Cited

U.S. PATENT DOCUMENTS

| | | | |
|---|---|---|---|
| 5,297,272 | 3/1994 | Lu et al. | 395/500 |
| 5,386,517 | 1/1995 | Sheth et al. | 395/275 |
| 5,515,514 | 5/1996 | Dhuey et al. | 395/282 |
| 5,519,883 | 5/1996 | White et al. | 395/840 |

*Primary Examiner*—Kevin J. Teska
*Assistant Examiner*—Dan Fiul
*Attorney, Agent, or Firm*—Meltzer, Lippe, Goldstein, Wolf & Schlissel, P.C.

[57] ABSTRACT

A converter interface device transforms an incompatible first central processing unit (CPU2) chip into a chip compatible with a CPU1 chip. The CPU1 compatible chip, containing the CPU2, is interchangeable with the CPU1 chip. The converter interface device allows CPU2 to appear to a computer system as having the same pins and pin configuration as the CPU 1. The converter interface device has an address converter, a data converter and a control bus converter. These converters convert CPU2 signals into signals which are CPU1 compatible. In addition, the converter interface device has a bus decoder which decodes the converted CPU1 compatible signal of CPU2 and outputs a signal to a CPU switch unit. The CPU switch unit receives an external CPU select signal, and outputs a CPU1 and CPU2 enable/disable signals. Therefore, a computer system can be upgraded from CPU1 to CPU2, without having to discard the motherboard and software associated with the older CPU1. In addition, for a motherboard that can accommodate two or more CPUs, the converter interface device of the present invention allows having two different types of CPUs on such a motherboard, e.g., CPU1 and CPU2. The present invention further discloses a method for booting up the computer system to either CPU 1 or CPU2. Furthermore, a method for switching the computer system between CPU1 and CPU2 is disclosed.

23 Claims, 6 Drawing Sheets

DEVICE AND METHOD FOR RECONFIGURING A COMPUTER SYSTEM WITH AN INCOMPATIBLE CPU

FIELD OF THE INVENTION

The present invention relates to a device and a method for replacing an existing central processing unit (CPU) of a computer system with a different CPU (i.e., different make or model CPU) that is incompatible with the existing CPU. In particular, the present invention allows upgrading a computer system by replacing the existing CPU with a different CPU. Furthermore, for a motherboard that can accept multiple CPUs of the same type, the present invention allows addition of the different CPU to the existing motherboard containing an older type of CPU.

BACKGROUND OF THE INVENTION

FIG. 1 shows a conventional computer system 10 which comprise a display unit, such as a screen 20, an input unit such as a keyboard 30, and a functional unit 40 such as a tower. The tower 40 houses units which interface with the screen 20, the keyboard 30, and additional peripherals such as printers 50. The tower may also contain items such as a power supply, a hard disk, a floppy disk drive, a compact disk (CD) drive, an internal fax/modem and a sound board. But most importantly, the tower contains a "motherboard" which accommodates components which, in essence, drive the computer system.

The motherboard contains many components for operating the computer system. The main component on the motherboard is a central processing unit (CPU) which defines and controls the computer system and operates at a particular clock speed. For example, a typical computer may operate at an external clock speed of 33 MHz. In addition, the motherboard may contain a computer memory or random access memory (RAM), cache memory, EPROMs, arithmetic units and a clock signal source.

A computer system is often referred to by its CPU and speed. One such example is a 486DX, 66 MHz system, referring to the 486 CPU made by Intel™, operating at an internal clock speed of 66 MHz and external clock speed of 33 MHz.

With the fast pace of technological advances, newer CPUs are frequently introduced into the marketplace having improved speed (i.e., clock speed) and greater computing capabilities than existing CPUs. For example, Intel™'s 486 CPU or "chip" improved upon Intel™'s 386 CPU. The 486 CPU has greater computing capabilities and clock speed, and processes data in 32 bits instead of 16 bits used by the 386 CPU. Intel™'s Pentium™ CPU, succeeding the 486 CPU, is even more powerful than the 486 CPU.

Upgrading a computer system having an Intel™ 486SX CPU to an Intel™ 486DX CPU is simple because it requires a mere replacement of CPUs. This is because the chips are manufactured to be fully compatible. The input/output (I/O) signals of the two CPUs have the same signal format and are located at identical pin locations. The I/O signals include clock, address, data and control signals. In addition, the same software used with the computer system driven by the 386 CPU may be used with the upgraded computer system driven by the 486 CPU. Therefore, the Intel™ 486 CPU was designed to be interchangeable with the Intel™ 386 CPU on the same motherboard, without the need for major hardware or software modifications.

However, upgrading a computer system with an incompatible CPU, for example, replacing an Intel™ 486 CPU with an Intel™ Pentium™ CPU requires changing the entire motherboard. The two CPUs are not compatible or interchangeable because they do not have the same pin arrangement or I/O signal format. Therefore, if one desires to upgrade the 486 motherboard to a Pentium™ CPU, the 486 motherboard, including the peripheral components contained thereon, must be replaced and discarded.

In addition, some CPUs, particularly those made by different manufacturers, not only have an incompatible pin configuration, but also have incompatible I/O signal formats. That is, these different CPUs run different software programs. The software written for one CPU is incompatible with the other CPU. For example, a PowerPC™ CPU made by a consortium of companies such as Motorola and IBM (e.g., PowerPC 603 of IBM) has pin locations, I/O formats, and software programs incompatible with Intel™ CPUs. Therefore, an upgrade from an Intel™ 486 CPU to a PowerPC™ CPU requires discarding both the 486 motherboard and all the associated software. This wastes a considerable amount of resources.

Motherboards for certain computer systems have a plurality of locations, e.g., chip sockets, for accepting CPUs. Such motherboards can only accept CPUs of the same type or family. For example, a motherboard having an Intel™ 386 CPU and having extra chip sockets can accept only compatible CPUs, for example, an Intel™ 386 or 486 chip. When a 486 chip is inserted into the extra chip socket of a motherboard having the 386 CPU, the 386 CPU will always be disabled due to "overdrive". Thus, the 386 computer system, upgraded to a 486 system, will have both the 386 and 486 chips on its motherboard, yet the 386 CPU is disabled.

Another conventional computer system having a plurality of CPUs is disclosed in U.S. Pat. No. 5,297,260. This computer system has a base processor element which includes two CPUs. Each CPU has its own individual local memories. In addition, this computer system has a dual-port RAM accessible from the CPUs, and a common bus switch circuit which connects one of the CPUs to a common bus shared by the CPUs. The hardware architecture of this computer system allows the two CPUs in the base processor element to operate as if they are a single processor. Using the second CPU for overhead processing, such as for dealing with interrupts and system management, reduces disturbance of the parallel control processing performed by the main CPU.

However, in this computer system, to implement a tight-linked parallel processing, the multiprocessor system is treated as one of the many jobs carried out by the multitasking. Therefore, each of the two CPUs in the base processor elements cannot execute its own operating system and/or application software separately and independently. Instead, each CPU must wait its turn as apportioned by the multitasking.

Illustratively, two state of the art CPUs exist that are incompatible with each other in terms of both pin configuration and software. The two CPUs illustratively discussed in this application are the 486 and the Power PC™ CPUs. It is clear to persons skilled in the art that the discussion applies to any incompatible CPUs. Because of their incompatibility, two complete computer systems are needed in order to have the capability of using software associated with each CPU. Of course, having two computer systems is both wasteful and expensive.

The problem of upgrading a computer system, without discarding the existing motherboard, can be solved if the new CPU is converted into a chip which is interchangeable with the old CPU. Furthermore, the problem of requiring two complete computer systems, each configured with a different CPU, can be eliminated if the incompatible CPUs are placed on a single motherboard capable of accepting a plurality of the same type of CPUs, with a method for switching between the incompatible CPUs.

It is therefore an object of the present invention to overcome the disadvantages of the prior art.

SUMMARY OF THE INVENTION

The present invention improves conventional computer systems by providing a converter interface that converts a new incompatible CPU into a chip which is interchangeable with an old CPU. This allows a CPU upgrade without replacing the entire motherboard or the existing software.

Furthermore, the two CPUs operate separately and independently of each other. Thus, the problems and inefficiencies associated with multitasking, such as waiting idle for its turn as apportioned by the multitasking are eliminated. Each of the two CPUs executes its own operating system and application software separately and independently.

The present invention provides a converter interface device for interchanging an incompatible first central processing unit (CPU2) integrated circuit package with a packaging of an existing CPU (CPU1). The converter interface device comprises an address converter, a data converter and a control bus converter. The address, data and control bus converters are connected to receive, address, data and control bus signals from the CPU2 and output to the computer system converted signals compatible with the CPU1. In addition, the three converters also receive from the computer system CPU1 compatible signals and convert these signals into CPU2 compatible signals for processing by CPU2.

A bus decoder is also connected to receive the converted address, data and control signals and to output a decoded signal into a CPU switch unit. In addition to being connected to receive the decoded signal, the CPU switch unit is connected to receive a CPU select signal. The CPU switch unit is also connected to output control signals. The control signals comprise a 'reset out', a CPU1 enable/disable and a CPU2 enable/disable signals.

The 'reset out' resets the computer system and boots it up with a selected CPU indicated by the CPU select signal. The enable/disable signals enable one CPU while disabling the other CPU. The CPU1 enable/disable signal, is inputted into the CPU1. The CPU2 enable/disable signal, also called a tristate output control signal, is inputted into the address, data and control bus converters to disable the CPU2 outputs when the CPU1 is enabled.

The present invention further comprises a method for booting up to a selected CPU a computer system with a plurality of CPUs. This method comprises the steps of initially booting up the computer system to a default CPU. Illustratively, the default CPU is CPU1 and its BIOS code is stored in a memory of the computer system such as an EPROM or a RAM.

Thereafter, a boot partition is accessed which contains a BIOS code for each of the CPUs and a boot manager program. A boot up selection menu, listing all the CPUs, may be displayed on a screen. Next, a selected CPU is chosen, and the computer system is booted up to that selected CPU. Illustratively, the boot partition may be stored on a hard disk of the computer system.

If the default CPU1 is selected for bootup among the plurality of CPUs, then a CPU1 boot partition is accessed and the bootup places the computer system in a CPU1 environment.

If CPU2 is selected for boot up, then the CPU2 BIOS code stored in a CPU2 boot partition is copied to a starting address for bootup in the memory of the computer system. Thereafter, the CPU1 is disabled by the CPU switch unit of the converter interface unit associated with the CPU2, and simultaneously, CPU2 is enabled by the CPU switch unit. Thereafter, the computer system is reset by the CPU switch unit of the converter interface unit and CPU2 boot partition is accessed. Executing instructions in the CPU2 boot partition places the computer system in a CPU2 working environment.

The present invention further comprises a method for switching from a CPU1 environment of the computer system to a CPU2 environment. This method comprises the steps of dedicating a first portion of a memory of the computer system to the CPU1 and a second portion to CPU2; storing a status of the CPU1 in the first portion of said memory; simultaneously disabling the CPU1 and enabling the CPU2; and switching the computer system so that the CPU2 environment is entered.

If the CPU2 was not previously loaded, then, after the step of storing, the BIOS of the CPU2 is copied to the second portion of the system's memory. The switching step accesses the second memory portion.

If the CPU2 was previously loaded, then the CPU2 can simply be switched into by issuing an interrupt to restore the status on the second memory portion to the previous CPU2 load. The interrupt or 'reset out' signal issued by the converter also refreshes value of the system time.

In another method for switching from a CPU1 environment of the computer system to a CPU2 environment, the memory of the computer system is not partitioned into two. Instead, when a switch CPU command is received, then the status of the CPU1 is stored on the hard disk of the computer system. The BIOS and the status of the CPU2 is copied to the memory of the computer system. Thereafter, for switching from CPU1 to CPU2 for example, CPU1 is disabled and CPU2 is enabled simultaneously. If the CPU2 was not previously loaded, then a soft reset is issued and the computer is switched to the CPU2 so that the CPU2 environment is entered. If the CPU2 was previously loaded, then an interrupt signal is issued to refresh the value of the system time and to restore the status of the CPU2.

One embodiment of the present invention allows using two or more different types of CPUs on a motherboard having a plurality of CPU sockets. This allows a user to choose between the different CPUs. Switching from one type of a CPU to another is accomplished through a simple boot up manager program or a switch-over program resident on the system memory. Therefore, the present invention eliminates the need to make drastic and expensive changes in the hardware and software architectures.

In short, the present invention solves the disadvantages of conventional computer systems by making it possible to upgrade a computer system by interchanging an old CPU with a new incompatible CPU incorporated into a chip compatible with the old CPU. Furthermore, the present invention allows two or more different types of CPUs to be placed on the same motherboard. Therefore, the present invention eliminates the disadvantage of being limited to a single CPU or the disadvantage of discarding the motherboard and the software associated with an old type of a CPU.

DETAILED DESCRIPTION OF PREFERRED EMBODIMENTS OF THE INVENTION

Figure 1:
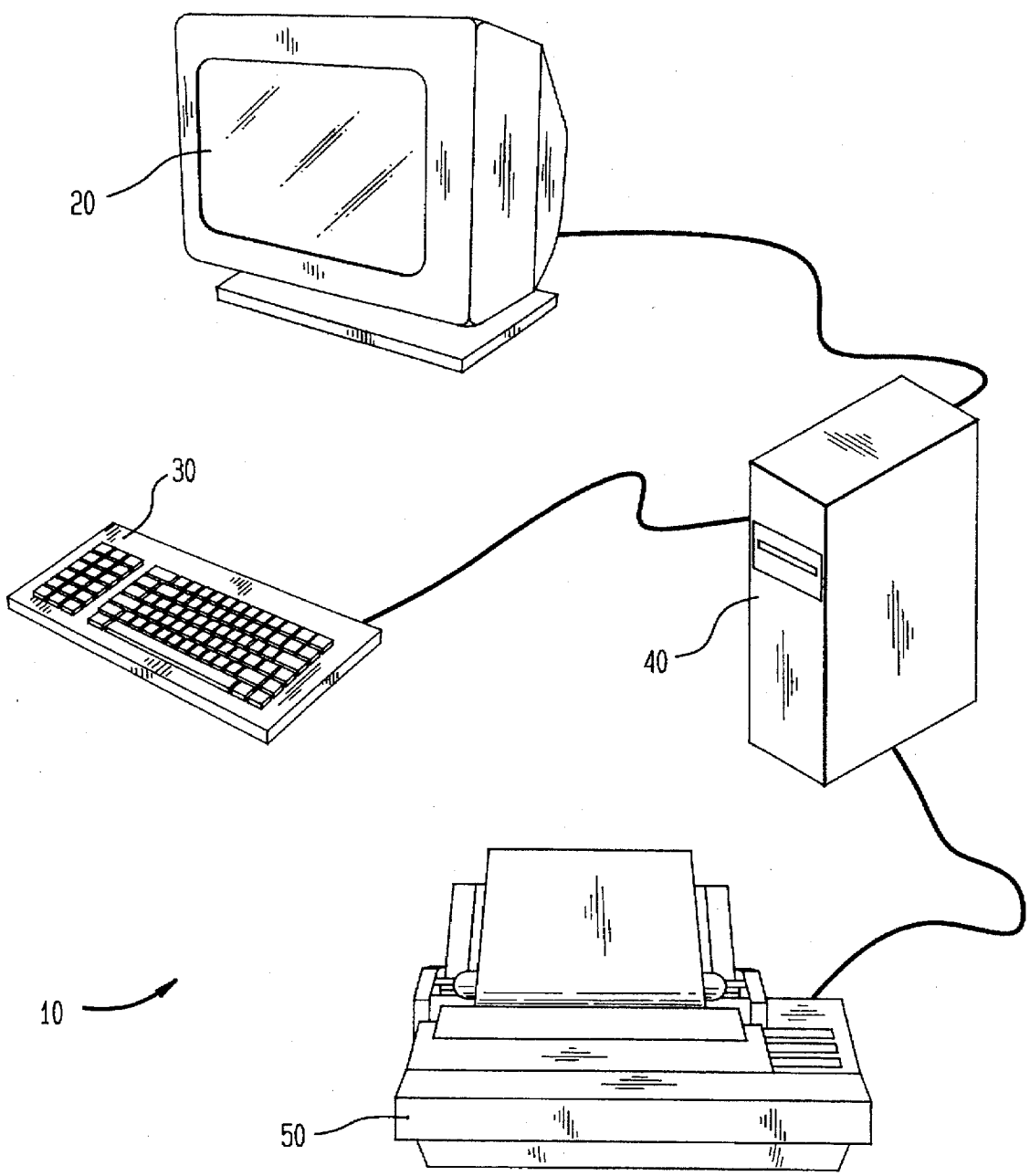
FIG. 1 shows a conventional computer system.

The present invention can be divided into two parts, namely, an apparatus part and a method part. The apparatus of the present invention comprises a converter interface device 100 whose architecture is shown by the dashed lines in FIG. 2.

The converter interface device 100 of the present invention, is a peripheral circuit to a CPU, which allows a CPU2 110 to be substituted for a CPU1 115, even if the CPUs are incompatible because of differences in the number of pins or pin functions between the CPU2 110 and the CPU1 115. Thus, the converter interface device 100 transforms the CPU2 integrated circuit 110 into a carrier 105 which is compatible with the CPU1 chip 115. Illustratively, CPU2 is a latest technology CPU such as the PowerPC™ CPU, and CPU1 is an older and incompatible CPU such as a 486 CPU.

The present invention incorporates the converter interface device 100 and the CPU2 110 into the carrier 105. The carrier 105 has the same number of pins, at the same locations and with the same functions and formats as the original CPU1 115. In this illustrative example, both the carrier 105 and the original CPU1 115 have a 'reset in' signal 111, a 'reset out' 162, an address I/O line 122, a data I/O line 132, and a control I/O line 142.

The converter interface device 100 on the carrier 105 converts the format of the I/O signals of the CPU2 110 to a format compatible with the I/O signals of the CPU1 115. Thus, the I/O signals of the carrier 105 (e.g., address, data and control signals) have a format which is compatible with the format of the I/O signals of the CPU1 115 even though the I/O signals of the CPU2 have a different format. Therefore, the carrier 105, with the CPU2 110 thereon, is interchangeable with the CPU1 115 and can be substituted for the CPU1 115 on the same CPU1 motherboard (not shown).

Figure 2:
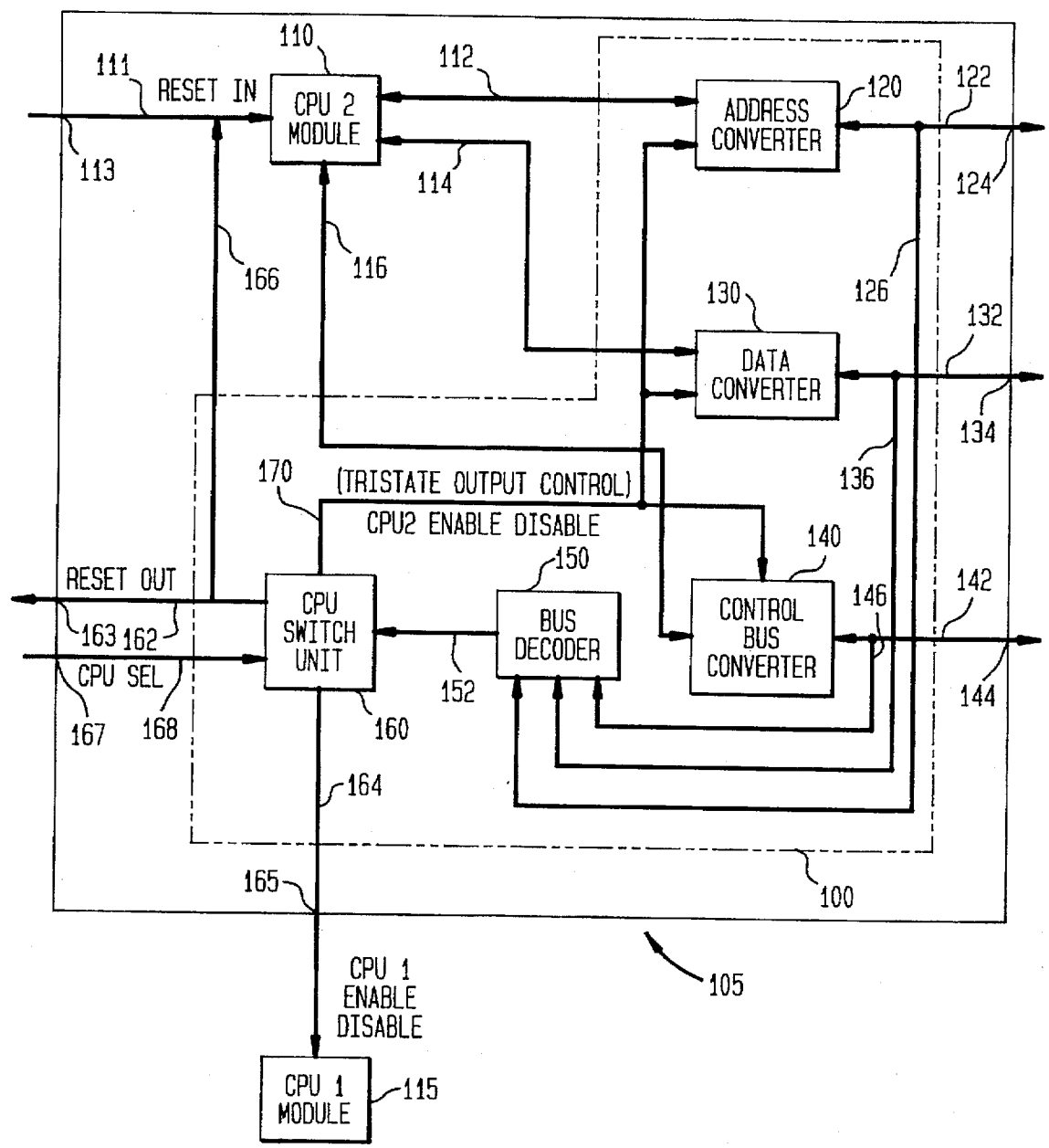
FIG. 2 shows the converter interface device according to the present invention.
Figure 3:
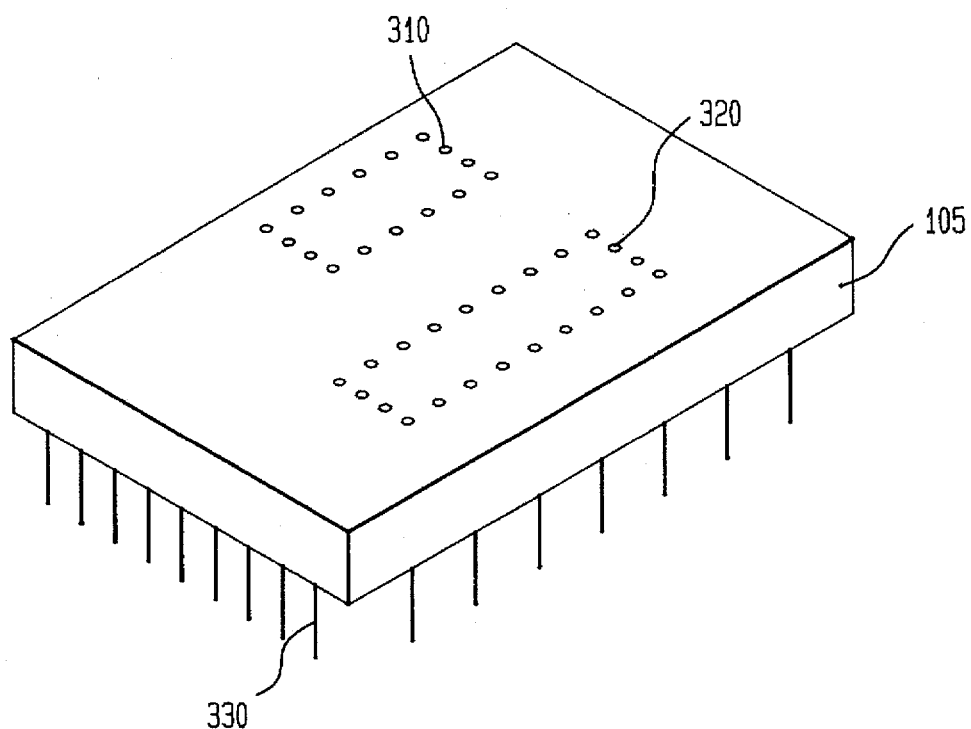
FIG. 3 shows a carrier of the converter interface device according to the present invention.

FIG. 3 shows the carrier 105 which has a socket 310 that accepts a CPU, e.g., the CPU2 (110 of FIG. 2), and a socket 320 that accepts the converter interface device (100 of FIG. 2). The converter interface device (100 of FIG. 2) interfaces with the CPU2 (110 of FIG. 2) so that the carrier 105 has the same pins 330 as an original CPU1 (115 of FIG. 2), where CPU1 and CPU2 are of different types. This allows the CPU2 110, as incorporated in the carrier 105, to be plugged onto the same motherboard (not shown) used for the CPU1 115. Thus, CPU1 can be easily substituted on the same motherboard by the carrier 105 which is controlled by the CPU2 110. Therefore, an upgrade from CPU1 to CPU2 does not require discarding the CPU1 motherboard or making extensive modifications. Instead, the CPU1 chip 115 on the CPU1 motherboard is replaced with the carrier 105 which is controlled by the CPU2 110.

Figure 4:
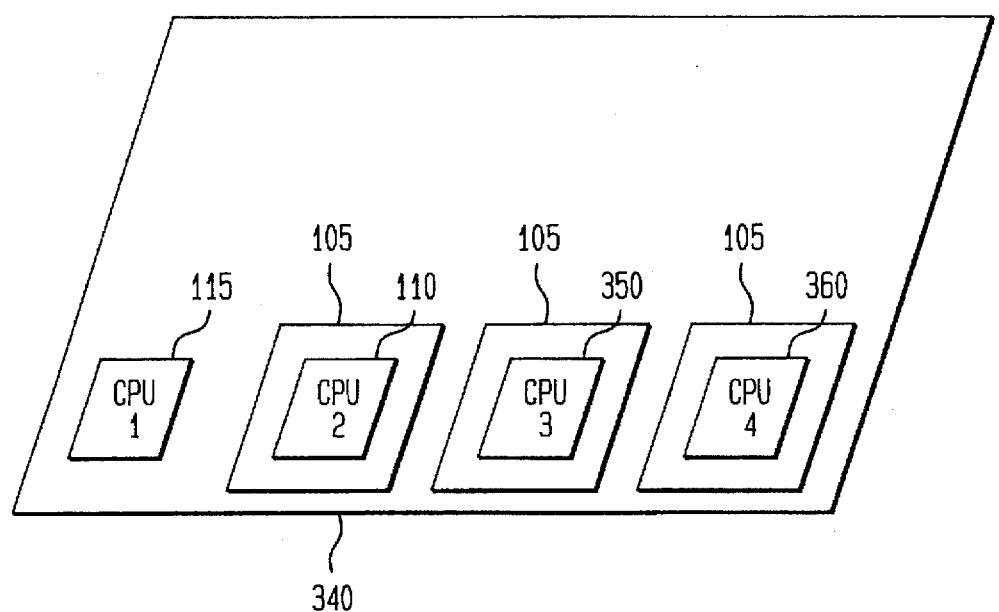
FIG. 4 shows a CPU1 motherboard having additional CPUs thereon, wherein each additional CPU is incorporated on its own carrier shown in FIG. 3.

Alternatively, for conventional motherboards having a plurality of chip sockets for receiving CPUs of the same type as the CPU1 115, the carrier 105 can be inserted into such a socket to yield a motherboard that has two different types of CPUs (i.e., CPU1 115 and CPU2 110). The converter interface device 100 of the present invention, shown in FIG. 2, can be tailored to transform different types of CPUs to a CPU1 compatible chip similar to the carrier 105. Therefore, a CPU1 motherboard can have as many carriers 105 as can be accommodated thereon, wherein each carrier 105 is controlled by a different type of CPU. For example, as shown in FIG. 4, in addition to having a CPU1 115, a CPU1 motherboard 340 has one carrier 105 controlled by a Pentium™ CPU (CPU2 110), while another carrier 105 is controlled by a PowerPC™ CPU (CPU3 350) and a third carrier 105 is controlled by yet a different type of CPU (CPU4 360). This yields a computer system that can be operated in different modes, each mode being controlled by a different type of CPU which is resident on the original CPU1 motherboard. For simplicity and illustrative purposes, the remaining discussion will be limited to two different types of CPUs, a CPU1 and a CPU2.

Returning to FIG. 2, the converter interface device 100 is specifically designed to convert one type of CPU (CPU2) to another type of CPU (CPU1). For example, a converter interface device may be designed to convert a PowerPC™ CPU to a 486 CPU. Each carrier 105 is dedicated to convert a specific type of CPU into another specific incompatible type of CPU. However, the same carrier 105 may be modified by a person skilled in the art, so that it converts different types of incompatible CPUs. A person skilled in the art may rearrange components of the converter interface device 100 to the proper specification for a desired conversion from one CPU to another incompatible CPU.

The converter interface device 100 comprises five parts. An address converter 120, a data converter 130, a control bus converter 140, a bus decoder 150 and a CPU switch unit 160. The three converters 120, 130, 140 are mainly used to perform relevant conversions when the Endian order of CPU1 115 and CPU2 110 are different from each other. The Endian order refers to the format of the signals. These conversions maintain the accuracy of any accessed data.

The address converter 120 receives CPU2 address signals from the CPU2 110 on an internal address bus 112 (internal to the carrier 105). The address converter 120 converts the CPU2 address signals into CPU1 compatible address signals which have a similar format to the address signals outputted by the CPU1 115.

The carrier 105 outputs to the computer system CPU1 compatible address signals on a CPU1 compatible address bus 122. The CPU1 compatible address bus 122 is connected to a pin 124 of the carrier 105. The pin 124 is at an identical location as the address pin output of the CPU1 115.

Similarly, the data converter 130 receives CPU2 data signals from the CPU2 110 on an internal data bus 114 and converts the CPU2 data signals into CPU1 compatible data signals. The converted CPU2 data signals have a similar format to data signals outputted by the CPU1 115. Thereafter, the data converter 130 outputs to the computer system the converted CPU2 data signals (i.e., CPU1 compatible data signals) on a CPU1 compatible data bus 132 which is connected to a pin 134. The pin 134 is at an identical location as the data pin output of the CPU1 115.

Also in a similar fashion, the control bus converter 140 receives CPU2 control signals from the CPU2 110 on an internal control bus 116 and converts the CPU2 control signals into CPU1 115 compatible control signals. The converted CPU2 control signals have a similar format to control signals outputted by the CPU1 115. Thereafter, the control converter 140 outputs to the computer system the converted CPU2 control signals (i.e., CPU1 compatible data signals) on a CPU1 compatible control bus 142 connected to a pin 144. The pin 144 is at an identical location as the control pin output of the CPU1 115.

For motherboards with a plurality of CPU sockets, accommodating CPU1 and CPU2 for example, the CPU1 compatible converted address, data and control buses 122, 132 and 142 and the internal address, data and control buses 112, 114 and 116 allow signals to flow in two directions. That is, the buses not only transfer CPU1 compatible converted address, data and control signals from the carrier 105 to the CPU1 motherboard, but also transfer CPU1 address, data and control signals from the CPU1 motherboard to the carrier 105.

Similarly, the address, data and control bus converters 120, 130 and 140 perform conversions from a CPU2 format to a CPU1 format and from a CPU1 format to a CPU2 format. In the latter case, the three converters 120, 130 and 140 convert CPU1 address, data and control signals received from the original CPU1 motherboard into a CPU2 compatible signals and input them into the CPU2 110 for processing. Illustratively, the address, data and control bus converters 120, 130 and 140 are incorporated into one or more chips designed to convert CPU1 compatible signals into CPU2 compatible signals and vice versa.

Internal to the carrier 105, the CPU1 compatible address, data and control buses 122, 132 and 142 are also applied to the bus decoder 150 through signal lines 126, 136 and 146, respectively. The bus decoder 150 decodes these inputted signals and outputs a decoded signal 152 which is a signal internal to the carrier 105. The reason for decoding the CPU1 compatible converted address, data and control signals 122, 132, 142 is to output the decoded signal 152 which controls the switching between the CPU1 and CPU2. That is, the decoder 150 is required for using the resources of both the CPU1 and CPU2.

The decoded signal 152 is inputted into a CPU switch unit 160. Illustratively, the CPU switch unit 160 is an I/O control register or a memory map control register. The CPU switch unit 160 outputs an internal CPU2 enable/disable signal on an internal CPU2 enable/disable line 170. The internal CPU2 enable/disable signal is also called a tristate output control signal since it is inputted to each of the three converters, i.e., the address converter 120, the data converter 130 and the control bus converter 140. The tristate output control signal controls the three converters so that the tristate output control signal will "tristate" or suspend the output signals of the CPU2 if the computer system switches into the CPU1 environment. That is, CPU2 is enabled or disabled depending on the status of the 'tristate output control' signal.

For motherboards with a plurality of CPU sockets, accommodating CPU1 and CPU2 for example, the CPU switch unit 160 also outputs a 'reset out' signal on a 'reset out' line 162 connected to a 'reset out' pin 163. The 'reset out' signal 162 is internally connected to the 'reset in' signal 111 through an internal connection 166 which is used to reset the system and the CPU2. The 'reset out' signal 162 is used to reset the system by providing an interrupt which resets the computer system and boots it up with the selected CPU indicated by the CPU select signal. The 'reset out' 162 and 'tristate output control' 170 signals can occur only once each time. That is, the 'reset out' 162 and 'tristate output control' 170 signals do not occur on the same cycle. The 'tristate output control' signal 170 is used to disable the output signals of the CPU2 when the CPU1 is running, which is enabled by the "CPU1 enable/disable" signal 164. The 'tristate output control' signal 170 is an internal signal which acts as a CPU2 enable/disable signal. Therefore, when a switch CPU command is executed, the 'tristate output control' signal 170 is first asserted and then a reset cycle based on the reset protocol of the CPU2 and CPU1 is executed.

Illustratively, the 'reset out' signal resets a control register (not shown) which may be an I/O control register or a memory map control register. The reset CPU switching control register (not shown) is ready to perform a "switch box" to change from one CPU to another. A "switch box" is a switch which insures that only one CPU is enabled at any one time.

For motherboards accommodating CPU1 and CPU2 for example, the CPU switch unit 160 also receives a CPU select signal on a CPU select line 168 connected to a CPU select pin 167. The CPU select signal is a signal external to the carrier 105. The state of the CPU select signal changes in response to instructions from an operator or a program to select a particular CPU (e.g., to select CPU1 or CPU2).

In response to the CPU select signal, the CPU switch unit 160 outputs a CPU1 enable/disable signal and a CPU2 enable/disable signal. The CPU1 enable/disable signal is outputted on a CPU1 enable/disable line 164 connected to a CPU1 enable/disable pin 165. The CPU2 enable/disable signal is outputted on an internal CPU2 enable/disable line 170.

The internal CPU2 enable/disable line 170, which is also called the tristate output, controls the address converter 120, data converter 130 and control bus converter 140 of the carrier 105. Illustratively, if the CPU select signal indicates selection of CPU1 115, then the internal CPU2 enable/disable signal disables the CPU2 110 and the external CPU1 enable/disable signal enables the CPU1 115. Thus, the output of the carrier 105 is interrupted and suspended. This insures that only one CPU is running or enabled at one time and all other CPUs are disabled.

To be compatible with the CPU1 chip 115, CPU2 110, which is incorporated into the carrier 105, receives the external 'reset in' signal 111 at pin 113 which is at an identical location as the 'reset in' signal of the CPU1 115. Similarly, all the pins of the carrier 105 have identical locations to the pins of CPU1 115. In addition, the pins of the carrier 105 bear I/O signals which are in a compatible format to the I/O signals of the CPU1 115.

Figure 5:
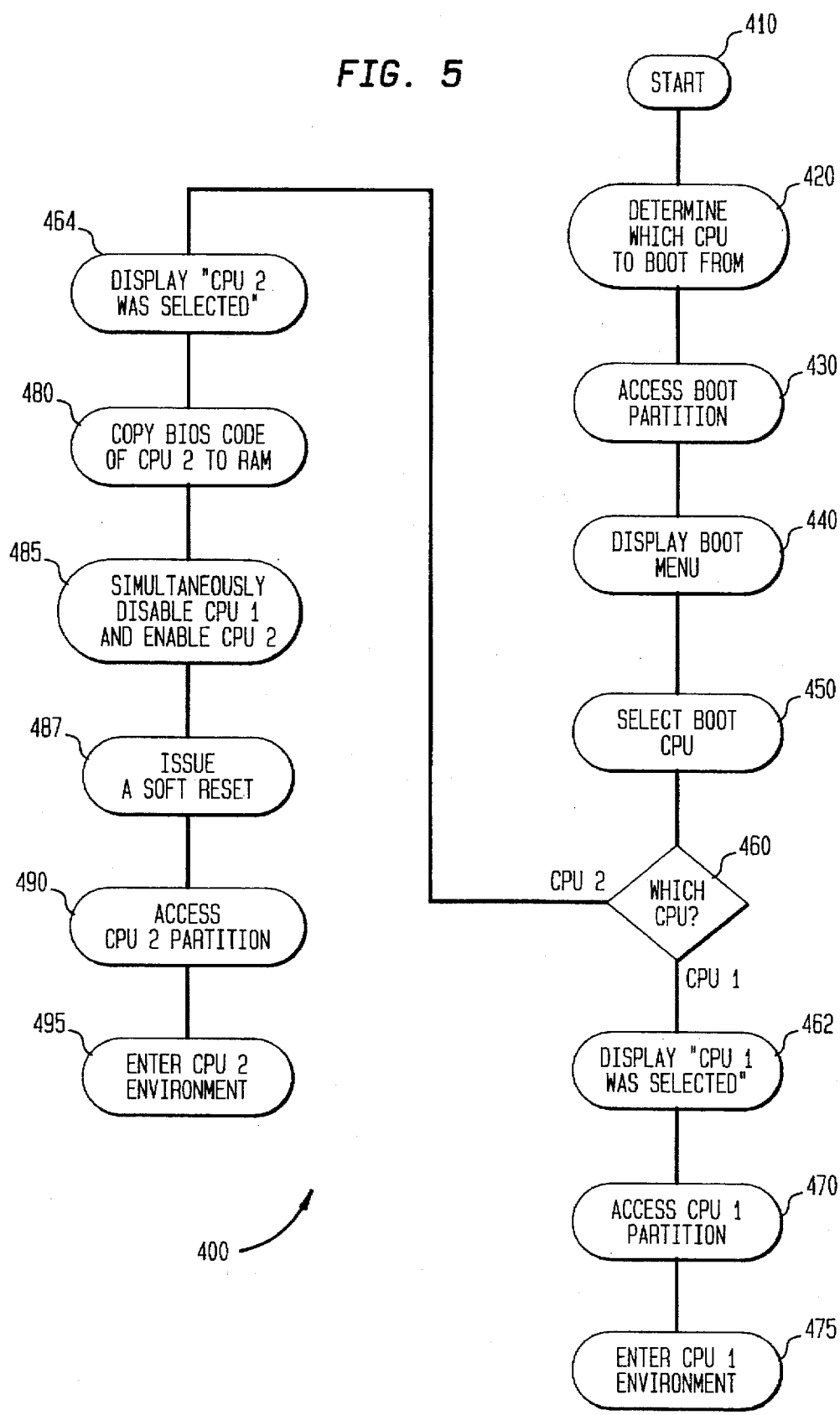
FIG. 5 is a flow chart of a method of the present invention wherein one of two CPU is selected for initial bootup of a computer system.
Figure 6:
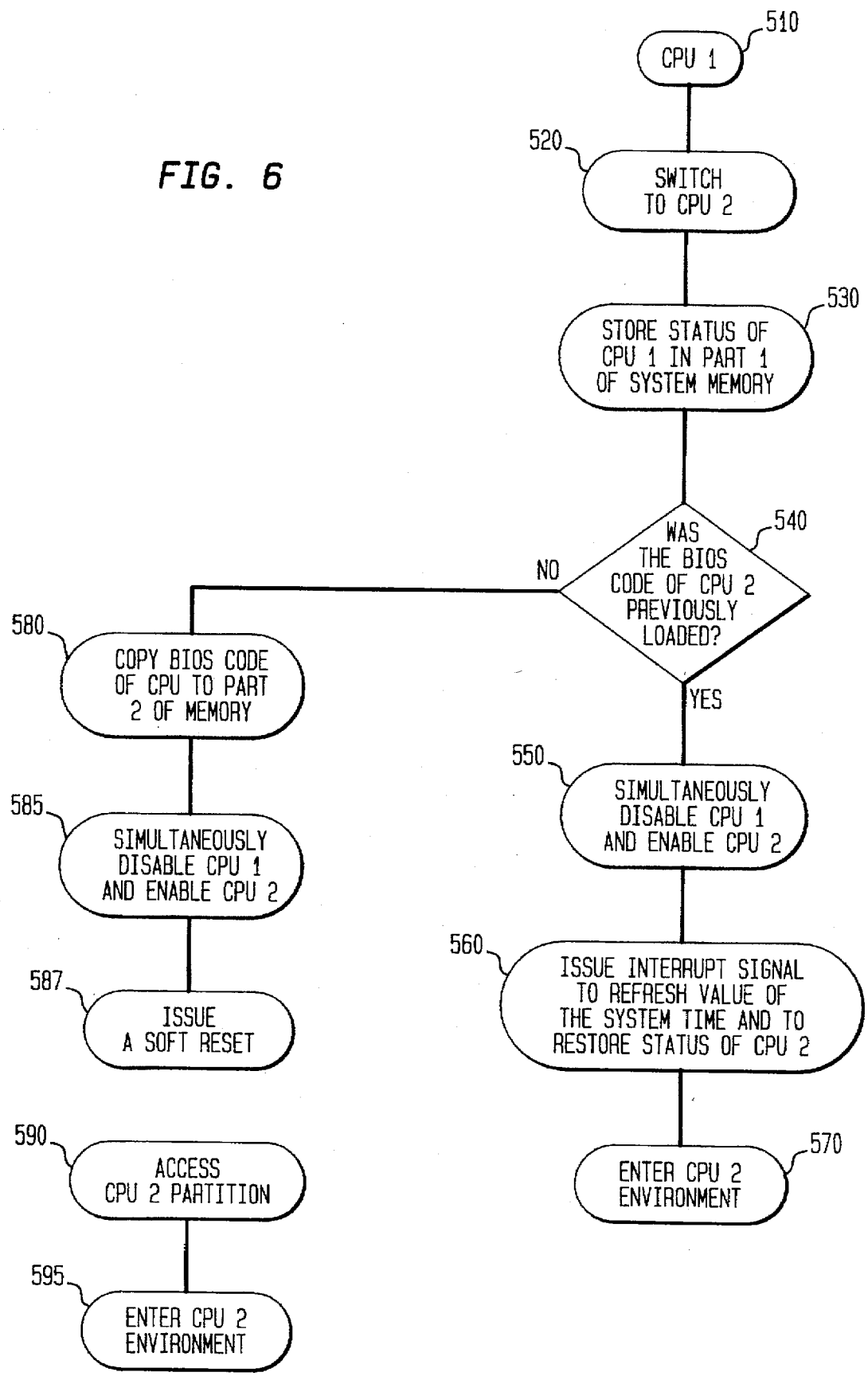
FIG. 6 is a flow chart diagram of one method of the present invention wherein a computer system already booted up to a CPU is switched to bootup to another CPU.
Figure 7:
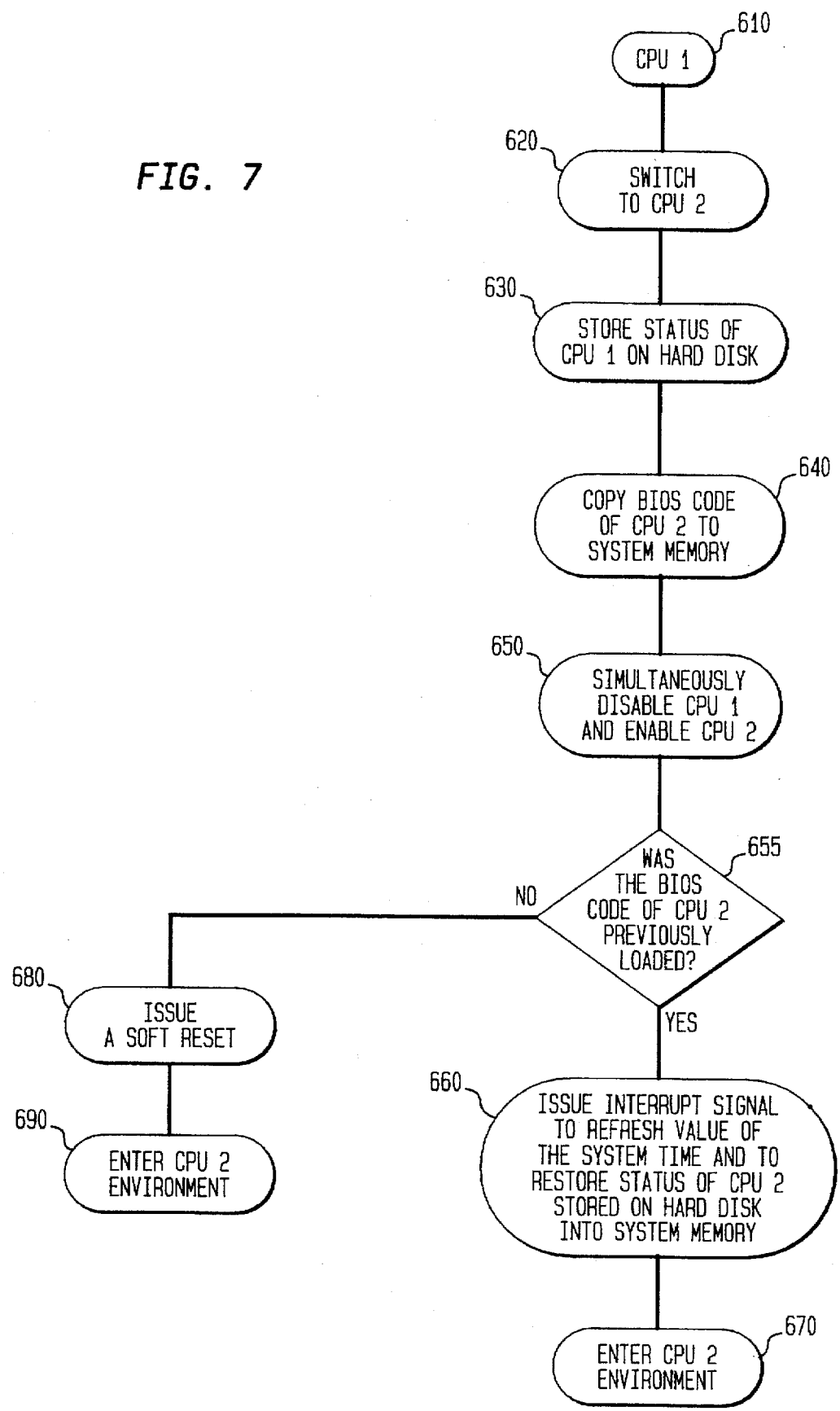
FIG. 7 is a flow chart diagram of a second method of the present invention wherein a computer system already booted up to a CPU is switched to bootup to another CPU.

FIGS. 5 to 7 describe methods of the present invention. Illustratively, for a multi-CPU motherboard (not shown), containing a CPU1 chip 115 and at least one carrier 105 of FIG. 2 (with the CPU2 110 incorporated therein), one method (400 of FIG. 5) of the present invention can boot up the computer system with either CPU1 or CPU2. Thus, the computer system can begin its operation using either the CPU1 or the CPU2. Other methods (500 of FIG. 6 and 600 of FIG. 7) of the present invention allow switching between the two CPUs while the computer is in use. For example, CPU1 can be booted up first through a predefined software resident in a boot up manager program. In addition, the hardware of the computer system can be configured for boot up to CPU1 through a jumper for example. Such a jumper could be a wire that short circuits two points at a particular location on the CPU1 motherboard or at an easily accessible connector on the tower of the computer system for example. Illustratively, for a CPU1 115 initial bootup, the CPU2 110 will be disabled by the CPU switch units 160 of FIG. 2.

FIG. 5 illustrates a method 400 for booting up to a selected CPU a computer system with a plurality of CPUs. Illustratively, a user selects either CPU1 or CPU2 to boot up the computer system. The bootup process begins with the initial turn on of the computer system (step 410). A default CPU performs a first initiating step 420 to get the computer to a boot partition (step 430) which displays a boot menu (step 440) for a user to select a bootup CPU (step 450).

Next, the computer determines which CPU is the default CPU and boots up initially from the default CPU (step 420). The computer will initially boot up (step 420) from the default CPU based on a hardware and software configurations of the computer system. The configuration of the computer system allows it to boot up initially from the default predetermined CPU. For purpose of illustration, the discussion describes a computer system that is designed to be initially booted up with CPU1 115. For example, the system's EPROM contains the BIOS of CPU1 and the hardware is configured for an initial default boot up with the CPU1 (e.g., via a jumper). After the preliminary actions (i.e., the computer turn on of step 410 and the boot up from CPU1 of step 420) that initialize the computer system, the system accesses a boot partition (step 430). Illustratively, the boot partition is stored on a hard disk of the computer system.

The boot partition includes the BIOS code of all the CPUs available to the computer system and a boot manager program. After accessing the boot partition (step 430), the boot manager program resident in the boot partition is executed thus accessing a boot menu (step 440). The boot menu displays a menu of the available CPUs that can be selected for boot up. Illustratively, CPU1 and CPU2 are displayed in the boot menu (step 440), but any number of CPUs may be available and displayed in the boot menu. Subsequently, the user selects a particular CPU as indicated in step 450.

After a particular CPU is selected (step 460), the computer system displays which CPU was selected to boot up with (step 462 or 464). If CPU1 was selected, then the system accesses the CPU1 boot partition (step 470) and boots up the computer system to CPU1, thus entering the working environment of CPU1 (step 475). If, on the other hand, the user selects CPU2 in the step 460 from the boot menu, then the following actions will be performed by the system. The CPU2 BIOS code in the CPU2 partition stored in a memory system, e.g., on a computer hard disk, is copied to a starting address of the CPU2 reset initial in the system memory, e.g., system RAM (step 480). That is, the CPU2 BIOS code is copied to a starting address or "initial reset" address of the CPU2. The starting address is the address which is accessed by the computer system upon being resetted. Each type of CPU has its own reset initial, wherein a specific address is accessed upon bootup. For example, the current commercial embodiment of an Intel 486 CPU has an initial reset address at ffff.fff0, while the current commercial embodiment of a Power PC CPU has an initial reset address at fff0.0100.

Next, the CPU1 is disabled and simultaneously CPU2 is enabled (step 485), Thereafter, a soft reset is performed (step 487). Illustratively, the soft reset is performed by executing programmed instructions. When the computer is reset, it boots up using the BIOS of the CPU2.

In step 485, CPU1 is disabled as follows. As shown in FIG. 2, the CPU switch unit 160 of the carrier 105 containing the CPU2 110 disables the CPU1 by outputting a CPU1 disable signal on the CPU1 enable/disable line 164, which is connected to the CPU1 enable/disable pin 165. In step 485, the CPU switch unit 160 also outputs an enabling signal on the internal CPU2 enable/disable signal line 170 which enables the CPU2. A soft reset (step 487) causes the computer system to boot up (step 490) to the CPU having its BIOS code in the system's RAM (step 480), i.e., CPU2, as the illustrative example of FIG. 5 shows (steps 480 to 495).

After disabling CPU1, enabling CPU2 and issuing the soft reset (steps 485–487), the CPU2 boot partition is entered (step 490) and executed. That is, the BIOS of the CPU2 is executed when the CPU2 boot partition is entered (step 490) after the soft reset (step 487). The soft reset (step 487) executes the BIOS of CPU2 because it was copied to the system memory, e.g., RAM, in step 480. Thereafter, the computer system boots up to CPU2 and enters the CPU2 environment (step 490).

FIG. 6 is a flow chart of a first method 500 used for switching CPUs while the computer system is in use after an initial bootup, Illustratively, the computer system is in the CPU1 working environment shown in step 510. When a command to switch to another CPU, e.g., CPU2, is received through, for example, a resident program or a driving program as shown in step 520, then two methods can be used to switch to the desired CPU (i.e., CPU2). These two methods are described below.

The first method 500, shown in FIG. 6, divides the system memory into two parts. Illustratively, part one is dedicated to CPU1, and part two is dedicated to CPU2. Thereafter, when a 'switch CPU' command is received, but before disabling the presently running CPU (i.e., CPU1), the status of the computer system (i.e., data in the computer memory, e.g., RAM, and currently running application software) at the time of the switch CPU command is stored on the hard disk, in the memory portion dedicated to CPU1, i.e., part one of the system memory (step 530). Storing the status of the computer system in an appropriate memory portion occurs each time the computer system is switched from one CPU to another CPU.

Thereafter, in step 540, a decisional check is made to determine whether the BIOS of the CPU2 was previously loaded. If the BIOS of the CPU2 was previously loaded, then the CPU Switch Unit 160 will disable CPU1 and enable CPU2 simultaneously (step 550). On the following step 560, an interrupt signal is issued to perform an interrupt service routine. Such an interrupt service routine refreshes the value of the system's time and restores the status of CPU2 (step 560). The interrupt signal, which is the 'reset out' signal (on the 'reset out' line 162), is issued by the overdrive reset unit 160 (FIG. 2). Finally, the CPU2 working environment is entered (step 570).

If, on the other hand, the BIOS code of CPU2 was not previously loaded, then steps 580 to 595 are performed. Steps 580 to 595 are analogous to steps 480 to 490 of FIG. 5. In step 580, the BIOS code of CPU2, stored on the hard disk, for example, is copied to part two of the computer system's memory which is dedicated to the CPU2. Next, in step 585, CPU1 is disabled and CPU2 is enabled simultaneously. Thereafter, in step 587, the CPU switch Unit 160 issues a soft reset signal to the computer system. Resetting the computer system causes the system to access and execute the CPU2 boot partition (step 590). This boots up the computer system with CPU2 and the CPU2 environment is entered (step 595).

FIG. 7 is a flow chart of a second method 600 for switching CPUs while the computer system is in use after an initial bootup. In this second method, used to switch the computer system from CPU1 to CPU2 for example, the system memory is not partitioned as in method 1 described above. Instead, the two CPUs, i.e., CPU1 and CPU2, share one main system memory. When either of the two CPUs is disabled, the data related to the disabled CPU is stored back into a storage medium, for example, on the hard disk. The next time this previously disabled CPU is enabled, the data stored on the hard disk associated with this CPU is read first and stored, for example in the system RAM. Alternatively, if a CPU is enabled for the first time, then its BIOS code is read and stored in the system's memory. Thereafter, the system is switched to the enabled CPU in a similar fashion described earlier. This places the system in the environment of the enabled CPU.

FIG. 7 is similar to FIG. 6 where, illustratively, the computer system is in the CPU1 working environment shown in step 610. When a command to switch to another CPU, e.g., CPU2, is received through, for example, a resident program or a driving program as shown in step 620, then the status of CPU1 is stored in the computer memory, e.g., the hard disk (step 630). These steps 620–630 are substantially the same as the steps 520–530 of FIG. 6. The only exception is that the status of CPU1 is stored in the hard disk in step 630, whereas, in step 530, the CPU1 status is stored in part one of the computer system's memory which is partitioned in the first method 500 of FIG. 6.

Thereafter, in step 640, the BIOS code of CPU2, stored on the hard disk, is copied to the computer system's memory, e.g., system RAM. Next, in step 650, CPU1 is disabled and CPU2 is enabled simultaneously. Next, in step 655, a decisional check is made to determine whether CPU2 was previously loaded in to the computer system, or whether CPU2 is being enabled for the first time. If CPU2 was previously loaded, then an interrupt signal is issued to perform an interrupt service routine. Such an interrupt service routine refreshes the value of the system's time and restores the status of CPU2 (step 660). At last, the computer system enters the CPU2's working environment (step 670).

If CPU2 was not previously loaded, then in step 680, a soft reset signal is issued by the CPU switch Unit 160 to the computer system. Resetting the computer system causes execution of the BIOS code of CPU2 which was stored in the system's memory in step 640. This boots up the computer system with the CPU2 which places the computer system in the CPU2 environment (step 690).

In short, a converter interface device is disclosed which can incorporate a new CPU into a chip compatible with an old CPU thus allowing replacement of the old CPU with the compatible chip containing the new CPU. For example, the converter interface device of FIG. 2 allows a PowerPC™ 603 CPU made by IBM to be interchanged with a 486 CPU chip made by Intel™ on the same 486 motherboard. That is, the converter interface device of FIG. 2 allows the PowerPC™ 603 CPU to appear to the computer system as having the same pins and pin configuration as the Intel™ 486 CPU.

For motherboards that can accommodate two or more CPUs, such as the motherboard of a 486 CPU, the converter interface device of the present invention allows the 486 motherboard to contain the 486 compatible PowerPC™ chip in addition to the 486 CPU instead of in substitution thereof. Therefore, a computer system can be upgraded to contain two CPUs, or upgraded to a newer CPU, without having to discard the motherboard and software associated with the older CPU.

For a computer system upgraded with the inventive converter interface device to contain two CPUs, the two CPUs operate separately and independently of each other. Each of the two CPUs executes its own operating system and application software separately and independently. This eliminates problems and inefficiencies associated with multitasking, such as waiting idle for its turn as apportioned by the multitasking.

The present invention also discloses a method for booting up to a desired CPU a computer system containing a plurality of CPUs. In addition, two methods for switching among a plurality of CPUs after bootup is disclosed.

The above-described embodiment of the present invention is intended to be illustrative only. Numerous alternative embodiments may be devised by those skilled in the art without departing from the spirit and scope of the following claims.

We claim:

1. A method for booting up a computer system having a plurality of CPUs to a selected CPU, comprising the steps of:

booting up said computer system to a default CPU1, accessing a boot partition after said boot up to said default CPU1, said boot partition containing a BIOS code for each of said plurality of CPUs, executing a boot manager program resident in the boot partition, choosing a selected CPU for boot up among said plurality of CPUs, and booting up said computer system to said selected CPU.

2. The method for booting up of claim 1, wherein the step of accessing further includes retrieving a BIOS of said default CPU1 stored in a memory of said computer system.

3. The method for booting up of claim 1, wherein the step of accessing further includes retrieving a BIOS of said default CPU1 from an EPROM of said computer system.

4. The method for booting up of claim 1, wherein the step of accessing further includes retrieving a BIOS of said default CPU1 from a RAM of said computer system.

5. The method for booting up of claim 1, wherein the step of accessing further includes retrieving said boot partition from a hard disk of said computer system.

6. The method for booting up of claim 1, wherein the step of executing the boot manager program further includes displaying on a screen a boot up selection menu listing said plurality of CPUs.

7. The method for booting up of claim 1, wherein said step of choosing further includes selecting said default CPU1, and after said step of choosing further includes the step of accessing a CPU1 boot partition from a memory of said computer system.

8. The method for booting up of claim 1, wherein said step of choosing a selected CPU selects a CPU2, and further includes the steps of after said step of choosing:

copying a BIOS of said CPU2 stored in a CPU2 boot partition to a starting address for boot up in a memory of said computer system, simultaneously disabling said CPU1 and enabling said CPU2, resetting said computer system after said CPU2 is enabled, accessing a CPU2 boot partition after said computer system is reset, and executing instructions in said CPU2 boot partition thereby entering a working environment of said CPU2.

9. A method for switching from a CPU1 environment of a computer system to a CPU2 environment comprising the steps of:

dedicating a first portion of a memory of said computer system to said CPU1 and a second portion of the memory to CPU2, storing a status of said CPU1 in said first portion of said memory, simultaneously disabling said CPU1 and enabling said CPU2, and switching said computer system to said CPU2 so that said CPU2 environment is entered.

10. The method for switching of claim 9, when a BIOS of said CPU2 was not previously loaded, further comprising after said step of storing, copying a BIOS of said CPU2 to said second portion of said memory of said computer system, wherein said step of switching accesses said second memory portion.

11. The method for switching of claim 9, wherein if a BIOS of said CPU2 was previously loaded, said step of switching includes restoring a status on said second memory portion to a previous CPU2 environment.

12. The method for switching of claim 9, wherein if a BIOS of said CPU2 was previously loaded, said step of switching includes issuing an interrupt, refreshing a value of the system time, and restoring a status on said second memory portion to a previous CPU2 environment.

13. A method for switching from a CPU1 environment of a computer system to a CPU2 environments comprising the steps of:

storing a status of said CPU1 on a hard disk of said computer system, copying a BIOS and a status of said CPU2 to a memory of said computer system, simultaneously disabling said CPU1 and enabling said CPU2, and switching said computer system to said CPU2 so that said CPU2 environment is entered.

14. The method for switching of claim 13, wherein if a BIOS of said CPU2 was not previously loaded, said step of switching includes issuing a soft reset.

15. The method for switching of claim 13, wherein if a BIOS of said CPU2 was previously loaded, then said step of switching includes issuing an interrupt signal refreshing a value of the system time and restoring said status of said CPU2 into said system memory.

16. The method of claim 1, further comprising the step of after choosing a selected CPU, displaying on a screen an indication of the selected CPU.

17. The method of claim 9, wherein the step of storing a status of said CPU1 further includes storing data in the computer system in said CPU1 environment.

18. The method of claim 17, wherein the step of storing data in the computer system in said CPU1 environment further includes storing a currently running application.

19. The method of claim 10, further comprising the step of before accessing said second memory portion, resetting the computer system.

20. The method of claim 11, wherein the step of restoring a status further includes restoring data previously in the computer system in a previous CPU2 environment.

21. The method of claim 13, wherein the step of restoring a status further includes restoring data previously in the computer system in a previous CPU2 environment.

22. The method of claim 13, wherein the step of storing a status of said CPU1 further includes storing data in the computer system in said CPU1 environment.

23. The method of claim 15, wherein the step of restoring said status further includes restoring data previously in the computer system in a previous CPU2 environment.

* * * * *